United States Patent
Feeman

[11] 3,932,376
[45] Jan. 13, 1976

[54] SULFO PHENYL-AZO-SULRO PHENYL-AZO-ALKOXY-DIPHENYL COMPOUNDS

[75] Inventor: James F. Feeman, Wyomissing, Pa.

[73] Assignee: Crompton & Knowles Corporation, Worcester, Mass.

[22] Filed: Oct. 6, 1971

[21] Appl. No.: 187,150

[52] U.S. Cl. ............... 260/186; 260/205; 260/206
[51] Int. Cl.² ................. C09B 43/00; C09B 31/06
[58] Field of Search ............ 260/174, 177, 184, 186

[56] References Cited
UNITED STATES PATENTS

| | | | |
|---|---|---|---|
| 2,152,408 | 3/1939 | Graenacher et al. | 260/186 |
| 2,286,317 | 6/1942 | Stanley | 260/186 X |
| 3,089,868 | 5/1963 | Gaetani | 260/186 |

*Primary Examiner*—Charles F. Warren
*Attorney, Agent, or Firm*—Synnestvedt & Lechner

[57] ABSTRACT

Compounds having the structure:

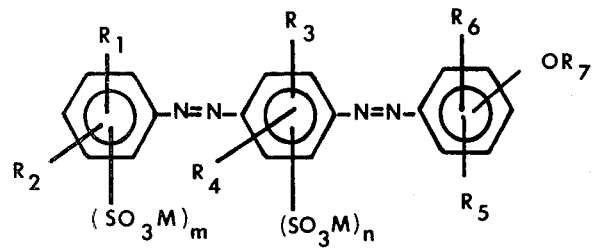

wherein
M represents —H, —Li, —Na, —K or —NH$_4$;
$R_1$ represents —H, lower alkyl, lower alkoxy, —Cl or —Br;
$R_2$ represents —H, lower alkyl or —Cl;
$R_3$ represents —H, lower alkyl or lower alkoxy;
$R_4$ represents —H, lower alkyl or lower alkoxy;
$R_5$ represents —H, lower alkyl, lower alkoxy, —Cl, phenyl, or cyclohexyl;
$R_6$ represents —H, lower alkyl or lower alkoxy;
$R_7$ represents —H, lower alkyl, lower alkyl sulfonyl or —SO$_2$

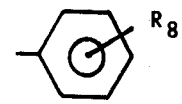

wherein
$R_8$ represents —H, —CH$_3$ or —Cl; the —OR$_7$ group is located $o$ or $p$ to the azo linkage;
$m$ is 1 or 2, $n$ is 0 or 1 and $m + n$ is 2 are useful in the dyeing of polyamides such as nylon, silk and wool, and that are especially useful for the dyeing of the deeper dyeing nylon components of differential dyeing nylon textiles in yellow to scarlet shades.

2 Claims, No Drawings

SULFO PHENYL-AZO-SULRO PHENYL-AZO-ALKOXY-DIPHENYL COMPOUNDS

This invention relates to new compounds that are useful in the dyeing of polyamides such as nylon, silk and wool, and that are especially useful for the dyeing of the deeper dyeing nylon components of differential dyeing nylon textiles.

The new compounds have the structure

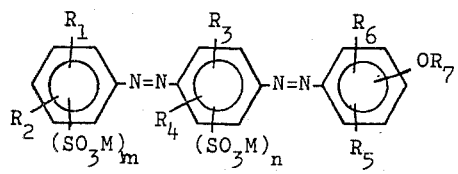

wherein
M represents —H, —Li, —Na, —K or —NH$_4$;
R$_1$ represents —H, lower alkyl, lower alkoxy, —Cl or —Br;
R$_2$ represents —H, lower alkyl or —Cl;
R$_3$ represents —H, lower alkyl or lower alkoxy;
R$_4$ represents —H, lower alkyl or lower alkoxy;
R$_5$ represents —H, lower alkyl, lower alkoxy, —Cl, phenyl, or cyclohexyl;
R$_6$ represents —H, lower alkyl or lower alkoxy;
R$_6$ represents —H, lower alkyl, lower alkyl sulfonyl or

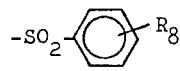

wherein R$_8$ represents —H, —CH$_3$ or —Cl; the —OR$_7$ group is located $o$ or $p$ to the azo linkage; $m$ is 1 or 2, $n$ is 0 or 1 and $m + n$ is 2.

These compounds are prepared by 1. diazotizing an aminoaryl sulfonic acid such as orthanilic acid, metanilic acid, sulfanilic acid, toluidine sulfonic acid, anisidine sulfonic acid, chlorometanilic acid, xylidine sulfonic acid, cresidine sulfonic acid, chlorotoluidine sulfonic acid, bromoaniline sulfonic acid, dichloroaniline sulfonic acid or an aminoaryl disulfonic acid such as an aniline disulfonic acid, a toluidine disulfonic acid, a chlorotoluidine disulfonic acid or an anisidine disulfonic acid and the like;
2. coupling with a suitable aromatic amine capable of coupling para to the amino group, such as aniline, o- or m-toluidine, o- or m-anisidine, o- or m-phenetidine, cresidine, 2,5-dimethoxy-aniline and the like;
3. sulfonating the isolated aminomonoazo intermediate, if it does not already contain two sulfonic acid groups, to produce an aminomonoazo-disulfonic acid intermediate;
4. rediazotizing the aminomonoazo disulfonic acid intermediate;
5. coupling with a suitable hydroxybenzene such as phenol, cresol, xylenol, methoxyphenol, methoxycresol, chlorophenol, cyclohexylphenol, phenylphenol, chlorocresol, propylphenol, butylphenol, amylphenol, or hexylphenol and optionally
6. alkylating the resultant hydroxy disazo dye with dimethyl sulfate, diethyl sulfate, methyl chloride, ethyl chloride, methyl bromide, or the like or
7. forming a sulfonic acid ester of the hydroxy disazo dye by reaction with reagents such as methane sulfonyl chloride, ethane sulfonyl chloride, propane sulfonyl chloride, butane sulfonyl chloride, benzene sulfonyl chloride, toluene sulfonyl chloride, chlorobenzene sulfonyl chloride.

The unalkylated yellow to scarlet dyes produced at step 5 of the above process have the generic structure:

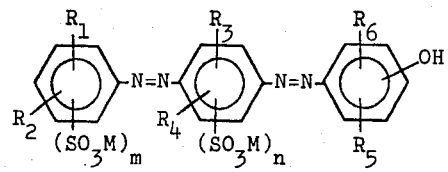

while the alkylated yellow to scarlet dyes produced at step 6 of the above process have the generic structure:

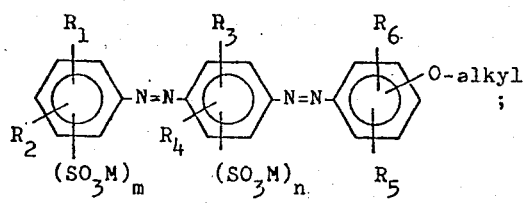

and the esterified yellow to scarlet dyes produced at step 7 of the above process have the generic structure:

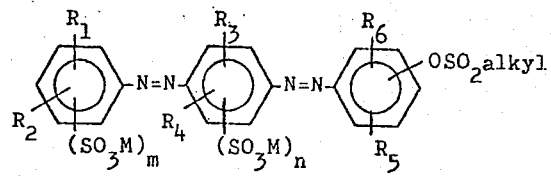

or

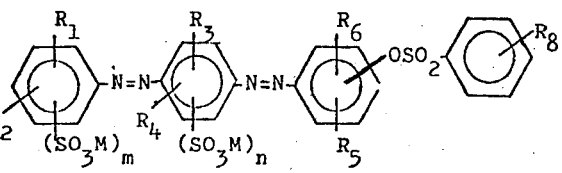

While the unalkylated dyes have desirable properties with respect to light and wash fastness, as well as dyeing, and economy of manufacture, they have the undesirable property of alkaline sensitivity, becoming redder or browner in hue upon contact with strongly alkaline reagents such as sodium hydroxide, sodium carbonate and the like, and also dye the deep-dyeing polyamide fibers in brown or reddish-brown shades which change to yellow or orange upon contact with dilute acidic solutions.

This deficiency is absent in the alkylated and esterified dyes, and, in general, the light fastness of these new dyes is better than that of the unalkylated dyes.

A preferred intermediate which is commercially available may be utilized to prepare a particularly valuable group of dyes of this invention. This is 4- aminoazobenzene-3,4'-disulfonic acid having the structure:

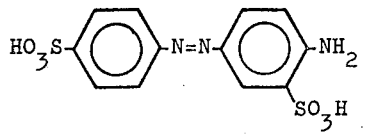

It can be used directly at step 4 of the preparative sequence given above. By diazotization, coupling with a suitable hydroxy benzene, and optionally alkylating or esterifying, dyes of the generic structure:

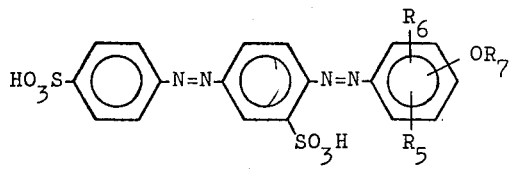

can be readily and economically produced which have outstanding properties.

The new dyes are usually produced as alkali metal salts of the sulfonic acids which can be used as such or converted to the free sulfonic acids by treatment with a strong inorganic acid and filtering. The free sulfonic acids can also be converted to various salts such as —Na, —K, Li, or —NH$_4$ by neutralization with a suitable hydroxide, carbonate, bicarbonate or ammonia.

The new compounds are useful as lightfast dyes for polyamides imparting reddish-yellow to yellowish-red hues. When applied to fibers or fabrics composed of two or more different types of polyamides which have differing dyeing characteristics — for example composite nylon yarns or textiles composed of regular nylon, deep dyeing nylon, ultradeep dyeing nylon, light dyeing (or "resist") nylon and cationic dyeable nylon, the dyes can be used to produce striking color contrasts between the different type fibers of a given composite by controlling the pH of the dye bath from which the dye is applied. Also, the dyes of this invention may be applied simultaneously with dyes of other types such as disperse, modified basic, or neutral-dyeing acid dyes, to give still other hue and contrast variants. In general, the dyes of this invention dye the deeper-dyeing nylons well at all usual pH values, e.g. from pH 2–11; however, at pH values above about 7 they do not dye regular, light dyeing or cationic dyeable nylon appreciably and at pH 9+ do not dye these components at all.

When the compounds of this invention are applied to a composite yarn or textile containing nylon 6 fibers and nylon 66 fibers, good differential dyeing is obtained between the nylon 6 and nylon 66 fibers, different depth of shade between the two types of nylon being obtained. The ratio of depth of shade between the two types of nylon, and the extent of exhaustion of the dyebath are dependent upon the pH value of the dyebath.

In general, degree of exhaustion decreases with increase in pH, and regular or light-dyeing nylon 6,6 is dyed in lighter shades or may even be undyed, while the more receptive components are deeply colored thus producing contrasts.

The new compounds are compatible with a wide variety of other dyes for polyamides when applied simultaneously from a common bath and, in general, they are not readily blocked by other dyes.

The following examples will serve to illustrate the preparation and use of the dyes of this invention. In these examples, parts and percentages are by weight and temperatures are in degrees centigrade, unless otherwise stated.

EXAMPLE 1

4-Aminoazobenzene-3,4'-disulfonic acid (35.7 parts) dissolved in 100 parts of water at pH 7.5 was cooled to 0° with ice, treated with 29 parts of concentrated hydrochloric acid and diazotized by addition of 7 parts of sodium nitrite as a concentrated aqueous solution at 0°. The resultant slurry of diazonium salt was added to 9.4 parts of phenol dissolved in 50 parts of water, 4 parts of sodium hydroxide, 20 parts of sodium carbonate, and ice to lower the temperature to 0°. After stirring for one hour the deeply colored solution was treated with sodium chloride (20% by weight based on volume of solution) and the brown precipitate was filtered and dried. It is a dark brown water-soluble solid which dyes nylon and other natural and synthetic polyamide fibers from weakly acidic aqueous dyebaths in reddish-yellow shades. The dyeings have very good fastness to light and washing. It dyes deep-dyeing nylon from neutral to alkaline baths in brown shades. These dyeings change to reddish-yellow when contacted with dilute acid solutions. Regular nylon 66 is only slightly stained by this dye in neutral or alkaline baths, while "resist" and cationic-dyeable nylon are completely undyed. It has the structure:

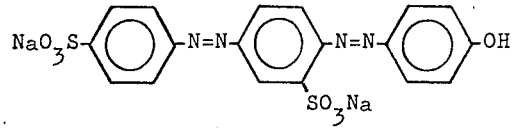

In the foregoing example the phenol was replaced with other phenolic coupling components listed in the following table and yielded dyes having slight shade changes but otherwise similar properties to that produced in Example 1.

| Example No. | Coupling Component |
|---|---|
| 2 | o-Cresol |
| 3 | m-Cresol |
| 4 | p-Cresol |
| 5 | 3-Methoxyphenol |
| 6 | 4-Methoxyphenol |
| 7 | 2-Chlorophenol |
| 8 | 4-tert Butylphenol |
| 9 | 2-sec. Amylphenol |
| 10 | 4-Octylphenol |
| 11 | 2,6-Dimethylphenol |
| 12 | 2-Methyl-6-tert. Butylphenol |
| 13 | 2-Phenyl-phenol |
| 14 | 3,5-Dimethylphenol |

EXAMPLE 15

The dye produced in Example 1 (25.3 parts) was dissolved in 400 parts of water with 4 parts sodium hydroxide, heated to 80° and treated during 45 minutes with 50 parts of diethyl sulfate keeping the pH above 11.5 by addition of further amounts of sodium hydroxide solution. The solution changed from dark brown to reddish-yellow color. Addition of salt (20% based on volume) and cooling to 70° gave crystalline precipitate which was filtered and dried. It is an orange colored solid which is highly water soluble and dyes nylon and other polyamide fibers in bright reddish-yellow shades from weakly acid baths. It dyes deep-dying nylon from neutral to alkaline baths in the same reddish-yellow shades while leaving other types of nylon in the same alkaline or neutral baths relatively slightly stained or unstained. The dyeings have exceptionally good fastness to light, excellent wash fastness, and are not changed in shade upon treatment with acidic or alkaline solutions. This dye has the structure:

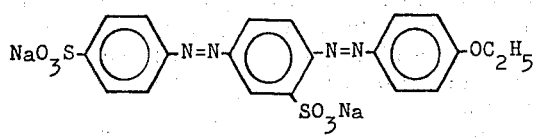

It may be converted to the free disulfonic acid by treatment with mineral acid in the cold and filtration; the free acid may in turn be converted to the potassium, lithium, or ammonium salts by treatment with potassium carbonate, potassium hydroxide, lithium carbonate, or ammonia, respectively.

In Example 15, replacement of the phenol with substituted phenolic coupling components listed in the following table yielded new dyes having similar properties.

| Example No. | Coupling Component |
|---|---|
| 16 | o-Cresol |
| 17 | m-Cresol |
| 18 | p-Cresol |
| 19 | 3-Methoxyphenol |
| 20 | 4-Methoxyphenol |
| 21 | 2-Chlorophenol |
| 22 | 4-tert.-Butylphenol |
| 23 | 2-sec.-Amylphenol |
| 24 | 4-Octylphenol |
| 25 | 2,6-Dimethylphenol |
| 26 | 2-Methyl-6-tert.-Butylphenol |
| 27 | 2-Phenylphenol |
| 28 | 3,5-Dimethylphenol |

EXAMPLE 29

The dye produced in Example 1 (12.6 parts) was dissolved in 90 parts of water with 5 parts of sodium carbonate, heated to 80° and treated with 6 parts of para-chlorobenzene sulfonylchloride during 5 minutes. After 20 minutes 20% (based on volume) of salt was added, the mixture was cooled to 30° and the crystalline precipitate was filtered and dried.

It is a water-soluble brown solid which dyes nylon and other natural and synthetic polyamide fibers from weakly acidic aqueous dyebaths in reddish-yellow shades having good fastness to light and washing. It dyes deep-dyeing nylon from neutral to alkaline baths in reddish-yellow shades while leaving other types of nylon in the same baths relatively slightly stained or unstained.

In Example 29, while otherwise proceeding as described but using the coupling components and sulfonyl chlorides listed in the following table as Examples 30–44 new dyes having similar properties were prepared.

| Example No. | Diazo Component | Coupling Component | Sulfonyl chloride |
|---|---|---|---|
| 30. | 4-Aminoazobenzene-3,4'-disulfonic acid | Phenol | Methane |
| 31. | " | Phenol | Benzene |
| 32. | " | Phenol | p-Toluene |
| 33. | " | m-Cresol | Methane |
| 34. | " | m-Cresol | Benzene |
| 35. | " | m-Cresol | p-Toluene |
| 36. | " | m-Cresol | p-Chlorobenzene |
| 37. | " | 3,5-Xylenol | Methane |
| 38. | " | 3,5-Xylenol | Benzene |
| 39. | " | 3,5-Xylenol | p-Toluene |
| 40. | " | 3,5-Xylenol | p-chlorobenzene |
| 41. | " | o-Phenylphenol | Methane |
| 42. | " | o-Phenylphenol | Benzene |
| 43. | " | o-Phenylphenol | p-Toluene |
| 44. | " | o-Phenylphenol | p-Chlorobenzene |

EXAMPLES 45–48

In example 15, while otherwise proceeding as described, the 4-Aminoazobenzene-3,4'-disulfonic acid was replaced with 4-Amino-2-methyl azobenzene-3,4'-disulfonic acid, coupled with the coupling components listed below and the resultant dyes alkylated with the reagents listed to produce new dyes having similar properties to those of the dye of Example 15.

| Example No. | Coupling Component | Alkylating Agent |
|---|---|---|
| 45. | Phenol | Dimethyl Sulfate |
| 46. | Phenol | Diethyl Sulfate |
| 47. | o-sec.-Butylphenol | Diethyl Sulfate |
| 48. | 3,5-Dimethylphenol | Diethyl Sulfate |

EXAMPLE 49

Aniline-2,5-disulfonic acid (25.3 parts) was diazotized and coupled with 13.7 parts of Cresidine at pH 3–3.5. The resultant monoazo intermediate was rediazotized at 40°, the diazonium salt solution treated at 0° with 10.8 parts of o-Cresol as 90% solution and sufficient sodium carbonate to raise the pH to 9 giving a dark solution of the dye having the structure:

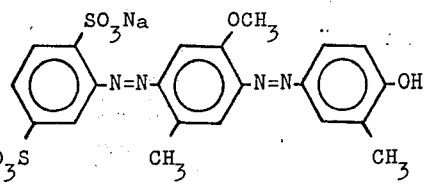

Salting the solution with 20% sodium chloride (based on volume), filtering the resultant precipitate and drying gave 56 parts of a dark brown colored water-soluble solid which dyes nylon and other natural and synthetic polyamide fibers from weakly acidic aqueous dye-baths in orange shades having good fastness to light and washing. It dyes deep-dyeing nylon from neutral to alkaline baths in brown shades which change to orange when contacted with dilute acid solutions. Regular nylon 66 is only slightly stained by this dye in neutral or alkaline baths, while resist and cationic dyeable nylon are completely undyed.

Dyes having similar dyeing and fastness properties and the shades on nylon listed were prepared using the intermediates listed in the following table:

| Example No. | Diazo Component | First Coupling Component | Second Coupling Component | Shade on Nylon from Acidic Bath |
|---|---|---|---|---|
| 50. | Aniline-2,5-disulfonic acid | 2,5-Dimethoxy-aniline | Phenol | yellowish-red |
| 51. | " | m-Toluidine | Phenol | yellow |
| 52. | " | Aniline | Phenol | yellow |
| 53. | " | 0-Anisidine | Phenol | reddish-yellow |

EXAMPLE 54

The dye of Example 49 when treated at pH about 11 with excess dimethyl sulfate in aqueous solution at 20°–40° gave the dye having the structure:

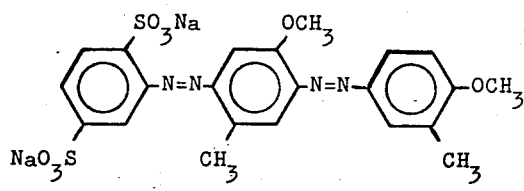

which dyes nylon and other polyamide fibers from weakly acidic baths orange shades having excellent fastness to light and washing. It also dyes deep-dyeing nylon in bright orange shades from neutral to weakly alkaline aqueous baths while leaving resist, regular, and cationic-dyeable nylon nearly unstained in the same baths.

Dyes having similar dyeing and fastness properties and the shades listed on nylon were prepared using the intermediates listed in the following table.

EXAMPLE 69

The dye of Example 1 when treated at pH above 11 with excess dimethyl sulfate in aqueous solution at 20°–40° gave the dye having the structure:

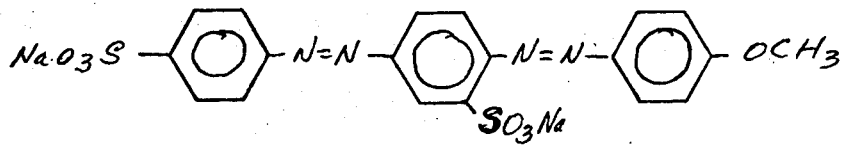

which has properties very similar to those of the dye of Example 15.

Many structurally related disazo dyes for nylon that have but a single sulfonic group are now known; however, the monosulfonic dyes will not give the striking true contrasts when applied to differential dyeing nylon textiles provided by the disulfonic disazo dyes of this invention.

I claim:

1. A compound having the structure:

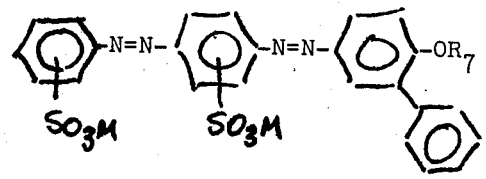

wherein M is H, Na, K, Li and NH$_4$; and R$_7$ is lower alkyl.

2. A compound, according to claim 1, wherein M is Na and R$_7$ is —C$_2$H$_5$.

* * * * *

| Example No. | Diazo Component | First Coupling Component | Second Coupling Component | Alkylating or Esterifying Agent | Shade on Nylon |
|---|---|---|---|---|---|
| 55. | Aniline-2,5-disulfonic acid | Cresidine | o-Cresol | Diethyl Sulfate | orange |
| 56. | " | Cresidine | o-Cresol | p-Toluene Sulfonyl Chloride | orange |
| 57. | " | 2,5-Dimethoxy-aniline | Phenol | Dimethyl Sulfate | yellowish-red |
| 58. | " | " | Phenol | Diethyl Sulfate | " |
| 59. | " | " | Phenol | p-Toluene Sulfonyl Chloride | " |
| 60. | " | m-Toluidine | Phenol | Dimethyl Sulfate | yellow |
| 61. | " | m-Toluidine | Phenol | Diethyl Sulfate | yellow |
| 62. | " | m-Toluidine | Phenol | p-Toluene Sulfonyl Chloride | yellow |
| 63. | " | Aniline | Phenol | Dimethyl Sulfate | yellow |
| 64. | " | Aniline | Phenol | Diethyl Sulfate | yellow |
| 65. | " | Aniline | Phenol | p-Toluene Sulfonyl Chloride | yellow |
| 66. | " | o-Anisidine | Phenol | Dimethyl Sulfate | reddish-yellow |
| 67. | " | o-Anisidine | Phenol | Diethyl Sulfate | " |
| 68. | " | o-Anisidine | Phenol | p-Toluene Sulfonyl Chloride | " |